US012726015B2

(12) United States Patent
Öhman et al.

(10) Patent No.: US 12,726,015 B2
(45) Date of Patent: Sep. 1, 2026

(54) HIGH VOLTAGE DIRECT CURRENT, HVDC, CONVERTER AND A METHOD FOR HANDLING A FAULT IN SUCH CONVERTER

(71) Applicant: Hitachi Energy Ltd, Zürich (CH)

(72) Inventors: Jimmy Öhman, Ludvika (SE); Ying Jiang Häfner, Ludvika (SE); Johan Österberg, Dalarna (SE); Michael Jons, Avesta (SE)

(73) Assignee: HITACHI ENERGY LTD, Zürich (CH)

( * ) Notice: Subject to any disclaimer, the term of this patent is extended or adjusted under 35 U.S.C. 154(b) by 210 days.

(21) Appl. No.: 18/705,946

(22) PCT Filed: Oct. 28, 2021

(86) PCT No.: PCT/EP2021/079980
§ 371 (c)(1),
(2) Date: Apr. 29, 2024

(87) PCT Pub. No.: WO2023/072398
PCT Pub. Date: May 4, 2023

(65) Prior Publication Data

US 2026/0163355 A1 Jun. 11, 2026

(51) Int. Cl.
*H02H 7/122* (2006.01)
*H02J 3/36* (2026.01)

(52) U.S. Cl.
CPC ............... *H02H 7/122* (2013.01); *H02J 3/36* (2013.01)

(58) Field of Classification Search
CPC .. H02M 1/32; H02M 7/48335; H02M 7/4835; H02H 7/122; H02J 3/36
See application file for complete search history.

(56) References Cited

U.S. PATENT DOCUMENTS

| | | | | |
|---|---|---|---|---|
| 9,755,537 | B2 * | 9/2017 | Kolar .................... | H02M 5/458 |
| 10,637,371 | B2 * | 4/2020 | Subramanian ........ | H02M 7/483 |
| 10,992,219 | B2 | 4/2021 | Takahashi et al. | |

FOREIGN PATENT DOCUMENTS

| | | |
|---|---|---|
| CA | 2883354 C | 1/2021 |
| CN | 111327119 A | 6/2020 |

(Continued)

OTHER PUBLICATIONS

Wang et. al., "Automation and Control Design of Overvoltage Protection for Sub-Modules in Modular Multilevel Converter", IEEE, 2017, 5 pages.

*Primary Examiner* — Crystal L Hammond
*Assistant Examiner* — Nicolas Alden Chapa Mills
(74) *Attorney, Agent, or Firm* — PROCOPIO, CORY, HARGREAVES & SAVITCH LLP

(57) ABSTRACT

A method for handling a fault in a High Voltage Direct Current, HVDC, converter (1) is provided. The method comprises operating a switch arrangement (120) of a plurality of cells (100) operating in an active mode so as to convert High Voltage Alternating Current, HVAC, to HVDC or HVDC to HVAC, while arranging the switch arrangement of each of the cells operating in the inactive mode to bypass the energy storage of the cell, in response to an error indication for a cell operating in the active mode, switching the cell from operating in the active mode to operate in the inactive mode, and in response to a recovery indication for the cell operating in the inactive mode, switching the cell from operating in the inactive mode to operate in the active mode.

6 Claims, 4 Drawing Sheets

(56) References Cited

FOREIGN PATENT DOCUMENTS

| | | | | |
|---|---|---|---|---|
| WO | 2010/145688 | A1 | 12/2010 | |
| WO | 2014/053156 | A1 | 4/2014 | |
| WO | WO-2021052731 | A1 * | 3/2021 | ......... H05K 7/14339 |

* cited by examiner

HIGH VOLTAGE DIRECT CURRENT, HVDC, CONVERTER AND A METHOD FOR HANDLING A FAULT IN SUCH CONVERTER

The present application is a national stage entry of International Patent Application No. PCT/EP2021/079980, filed on Oct. 28, 2021, the disclosures of which are hereby incorporated herein by reference as if set forth in full.

TECHNICAL FIELD

The present disclosure generally relates to the field of power transmission systems. More specifically, the present disclosure relates to a method for handling a fault in a High Voltage Direct Current, HVDC, converter and HVDC converter.

BACKGROUND

HVDC converters are operated in HVDC transmission systems in order to convert between high voltage alternating current, HVAC, and HVDC. HVDC converters include electrically connected cells, wherein the electrically connected cells form valves of the converters. An HVDC converter may be configured to operate by using at least some of its cells. However, if an erroneous behaviour is detected in a cell, either the cell needs to be disconnected from the converter, or the converter, comprising the cell, needs to be tripped. Disconnection of a cell is usually made by mechanically bypassing the cell by using a mechanical bypass switch, which permanently bypasses the cell. The mechanically bypassed cell may not be replaced or repaired during operation of the converter comprising the cell, thereby reducing the redundancy of the converter. The entire converter may need to be taken out of operation in order to replace or repair the cell. If too many cells of a converter are mechanically bypassed the converter may not be able to operate and has to be taken out of operation in order to replace and/or repair the mechanically bypassed cells. Thus, the availability of the converter cell is reduced.

In light of the above, there is therefore a need for providing an increased redundancy and/or availability for HVDC converters.

SUMMARY

To at least partially fulfil the above requirements, the present disclosure seeks to provide at least an improved method for handling a fault in an HVDC converter and an improved HVDC converter.

To achieve this, a method for handling a fault in an HVDC converter and an HVDC converter as defined in the independent claims are provided. Further embodiments of the present disclosure are provided in the dependent claims.

According to a first aspect of the present disclosure, a method for handling a fault in a High Voltage Direct Current, HVDC, converter is provided. The HVDC converter comprises a plurality of converter valves. Each converter valve comprises a plurality of cells electrically connected in series. Each cell of the plurality of cells comprises an energy storage and a switch arrangement. The plurality of cells are operable to convert High Voltage Alternating Current, HVAC, to HVDC or HVDC to HVAC. Each cell of the plurality of cells is configured to be operated in an active mode and in an inactive mode. The method comprises operating the switch arrangement of each of the cells operating in the active mode so as to convert High Voltage Alternating Current, HVAC, to HVDC or HVDC to HVAC, while arranging the switch arrangement of each of the cells operating in the inactive mode to bypass the electrical energy storage of the cell. The method further comprises in response to an error indication for a cell operating in the active mode, switching the cell from operating in the active mode to operate in the inactive mode. The method further comprises, in response to a recovery indication for the cell operating in the inactive mode, switching the cell from operating in the inactive mode to operate in the active mode.

According to a second aspect of the present disclosure, a HVDC converter is provided. The HVDC converter comprises a plurality of converter valves. Each converter valve comprises a plurality of cells electrically connected in series. Each cell of the plurality of cells comprises an energy storage and a switch arrangement, wherein the plurality of cells are operable to convert HVAC to HVDC or HVDC to HVAC. The HVDC converter further comprises a control system operably connected to the switch arrangements of the plurality of cells and configured to operate each cell of the plurality of cells in an active mode and in an inactive mode. The control system is further configured to operate the switch arrangement of each of the cells operating in the active mode so as to contribute to converting High Voltage Alternating Current, HVAC, to HVDC or HVDC to HVAC while the switch arrangement of each of the cells operating in the inactive mode is arranged to bypass the electrical energy storage of the cell. The control system is further configured to determine an error indication for a cell operating in the active mode and switch the cell from operating in the active mode to operate in the inactive mode in response to the error indication. The control system is further configured to determine a recovery indication for the cell operating in the inactive mode. The control system is further configured to switch the cell from operating in the inactive mode to operate in the active mode in response to the recovery indication.

The fault may be understood as, for example, an error, or a temporary error. Thus, the present disclosure may provide a method for handling an error, or a temporary error, in a HVDC converter.

A cell which is operating in the active mode may be able to be inserted, or bypassed, by means of the switch arrangement of the cell, in order to contribute to converting HVDC to HVAC, or HVAC to HVDC. In the context of the present disclosure, the term "inserted" may be understood as, for example, that a cell voltage of the inserted cell is increased or decreased, that current flowing through a valve, in which the cell is allocated, is flowing through the energy storage of the cell thereby causing the cell voltage to increase or decrease, or that the energy storage of the inserted cell is available for increasing or decreasing the cell voltage of the inserted cell in order to contribute to conversion between HVDC and HVAC. The switch arrangement of a cell operating in the active mode may be controlled by insert or bypass orders from the control system. In other words, each cell operating in the active mode may contribute to the forming of a combined AC waveform, or to the conversion of an AC waveform to HVDC.

A cell which is operating in the inactive mode, which also may be referred to as a temporary bypass mode or a temporary soft bypass mode, may be understood as not contributing to the conversion of HVDC to HVAC, or the conversion of HVAC to HVDC. Consequently, charging or discharging of a cell may be interrupted when the cell is switched to operating in the inactive mode.

The error indication may be indicative of an error comprising at least one of a communication error, a hardware issue, a software bug, and an unforeseen disturbance. Some errors, such as, for example, a communication error, may be intermittent, while others, such as, for example, a hardware issue or a software bug, may require maintenance, repairs, or action by an operator to be resolved. Operating a converter which comprises a cell experiencing an error, i.e. an incorrectly operating cell, may cause a failure of the converter. Thus, it is of utmost importance that a cell experiencing an error is taken out of ordinary operation as soon as possible. By switching a cell to operate in the inactive mode in response to the error indication, the time of operation of a cell, which is experiencing an error, may be reduced. Further, by switching a cell to operate in the inactive mode in response to the error indication, the failure of the converter can be avoided. However, if the cell is experiencing an intermittent error, or if the error indication is a false indication, it is unnecessary to take the cell out of operation longer than necessary, i.e. permanently or until maintenance of the converter, as that would reduce the redundancy of the converter. Therefore, the present disclosure allows for a temporary bypass of a cell, i.e. temporarily operating the cell in the inactive mode.

The recovery indication may be indicative of that the error, for which the error indication was indicative, has ceased.

A switch arrangement of a cell may comprise a plurality of switches, which may be (power) semiconductor switches. A switch arrangement may comprise, for example, a plurality switches arranged in a half-bridge configuration or in a full-bridge configuration.

The present disclosure is based on the concept of being able to switch a cell between operating an active mode and an inactive mode. By switching the cell from operating in the active mode to operate in the inactive mode in response to an error indication, unnecessary mechanical bypassing of the cell can be avoided. For example, if the error indication is indicative of an intermittent error, such as a communication error or a temporary error, there may not be a need to mechanically bypass the cell. Thus, switching the cell to operate in the inactive mode, from which it may be switched back to operating in the active mode, a mechanical bypass of the cell may be avoided, thereby increasing the redundancy and/or the availability of the converter comprising the cell since the cell will not be permanently bypassed.

In addition to the above, the method may further comprise switching the cell to operating in a mechanical bypass mode in which a mechanical bypass switch of the cell is arranged to permanently bypass the energy storage and the switch arrangement of the cell. This may be done in response to a fault indication, which may be indicative of fault which requires maintenance, repair, or replacement of the cell, or of a permanent fault. In the context of the present disclosure, the term "permanently bypassed" may be understood as, for example, that a cell is continuously bypassed until a maintenance, or shutdown, of the converter comprising the cell, and/or that the bypass of the cell in non-reversible during normal operation of the converter. A fault indication may therefore be understood as indicating a fault which may not be handled, or resolved, during normal operation of the converter. A cell may be switched to operating in the mechanical bypass mode from being operated in the active mode, or the inactive mode. Further, a cell operating in the active mode may be switched directly to operating in the mechanical bypass mode in response to fault indication. Alternatively, a cell operating in the active may first switch to operating in the inactive mode in response to an error indication and then switch to operating in the mechanical bypass mode in response to a fault indication. The method may comprise determining that an error indication comprises a fault indication. A cell may first be switched to operating in the inactive mode, then the error indication may be analysed in order to determine if the cell needs to be switched to operate in the mechanical bypass mode, i.e. to determine if the error indication comprises a fault indication. By first switching a cell to operate in the inactive mode in response to an error indication instead of directly to operating in the mechanical bypass mode, unnecessary mechanical bypasses of cells may be avoided, which may increase the redundancy of the converter.

A valve of the converter may be tripped if a predetermined number of cells of the valve are operated in the inactive mode or the mechanical bypass mode. Further, the entire converter may be tripped if a predetermined number of cells of the entire converter are operated in the inactive mode or the mechanical bypass mode. By the term "tripping" it is meant to, for example, disconnect, switch off, turn off, or deactivate a component or components, such as a valve or a converter. The method thereby allows for keeping track of the number of available cells of a converter valve, i.e. all cells not being operated in the inactive mode or the mechanical bypass mode. Therefore, the method allows for automatic tripping of a valve when a predetermined number of cells are being operated in the inactive mode or the mechanical bypass mode. Further, the method allows for protection tripping of the converting, and for restarting the converter without error due to the capability of keeping track of the number of available cells of a converter valve.

The control system may comprise a plurality of cell controllers. Each cell controller may be operably connected to a switch arrangement of a respective cell for switching the cell between the active mode and the inactive mode. Further, a cell controller may be operably connected to switch arrangements of a plurality of respective cells for switching the cells between the active mode and the inactive mode. A cell controller may be arranged locally to the cell, such that a decision to switch the cell to operating in the inactive mode may be made faster than if the decision would have to be made a central level, which may increase the performance of the converter.

The control system may further comprise a main controller operably connected to the plurality of cell controllers and configured to generate switching commands for the plurality of cell controllers, thereby converting High Voltage Alternating Current, HVAC, to HVDC or HVDC to HVAC. The control system may provide for a centralised control of the converter, which may increase the controllability of the converter.

A cell controller may be further configured send a status update, indicating a cell switching between the active mode and the inactive mode, to the main controller. The status update may further indicate a cell switching to the mechanical bypass mode. By providing a status update to the main controller, the main controller may be able to modify the switching commands such that the performance of the converter is not affected. The main controller may hence be responsible for the overall operation of the converter whereas the cell controller may be responsible for initiating the switching of a cell between the active mode and the inactive. Advantageously, the cell controller may provide a faster response to an error indication compared to the main controller, since the cell controller may be arranged locally at the respective cell.

Each cell controller may be operably connected to the switch arrangement of a respective cell via gate units of the respective cell. The gate units may be communicatively coupled to the cell controller. The communication between a gate unit and a cell controller may be monitored by the control system to determine a communication error, which for example may be an intermittent error or a temporary error. In addition to this, the control system may be further configured to determine when an error has ceased based on the monitored communication. The cell controller may be configured to determine the error based on a comparison between the monitored communication and a reference communication. By switching a cell to the inactive mode in response to an error indication based on a monitored communication, unnecessary mechanical bypassing may be avoided, which may increase the redundancy and/or availability of the converter.

Each cell of the plurality of cells may further comprise a mechanical bypass switch configured for bypassing the energy storage and the switch arrangement of the cell. The mechanical bypass switch may be operably connected to the control system for allowing each cell to be operated in a mechanical bypass mode, in which the mechanical bypass switch is arranged to permanently bypass the energy storage and the switch arrangement of the cell. This may for example be done in response to the control system determining a fault indication for the cell.

The control system may be further configured to trip a valve when a predetermined number of cells of the valve are operated in the inactive mode or the mechanical bypass mode.

It is noted that other embodiments using all possible combinations of features recited in the above described embodiments may be envisaged. Thus, the present disclosure also relates to all possible combinations of features mentioned herein. Any embodiment described herein may be combinable with other embodiments also described herein, and the present disclosure relates to all combinations of features.

BRIEF DESCRIPTION OF THE DRAWINGS

Exemplifying embodiments will be described below with reference to the accompanying drawings, in which.

All the figures are schematic, not necessarily to scale, and generally only show parts which are necessary in order to elucidate embodiments of the present invention, wherein other parts may be omitted or merely suggested. Like reference numerals refer to like elements throughout.

DETAILED DESCRIPTION

Figure 1:
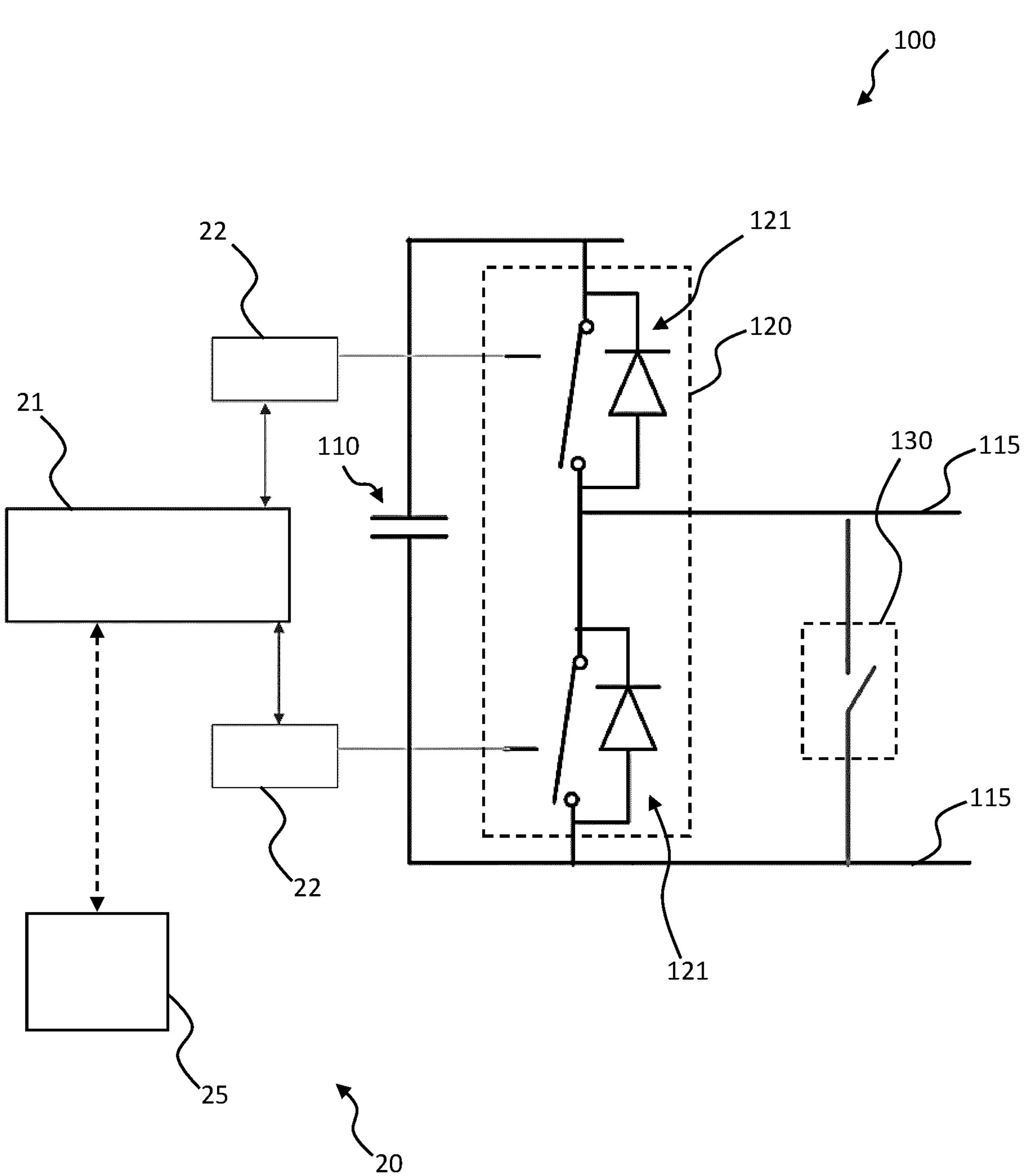
FIG. 1 is a schematic illustration of a cell of a HVDC converter.

The present disclosure will now be described hereinafter with reference to the accompanying figures, in which exemplifying embodiments are shown. The present inventive disclosure may, however, be embodied in many different forms and should not be construed as limited to the embodiments set forth herein; rather, these embodiments are provided by way of example so as to convey the scope of the disclosure to those skilled in the art. In the figures, identical reference numerals denote the same or similar components having a same or similar function, unless specifically stated otherwise.

Figure 2:
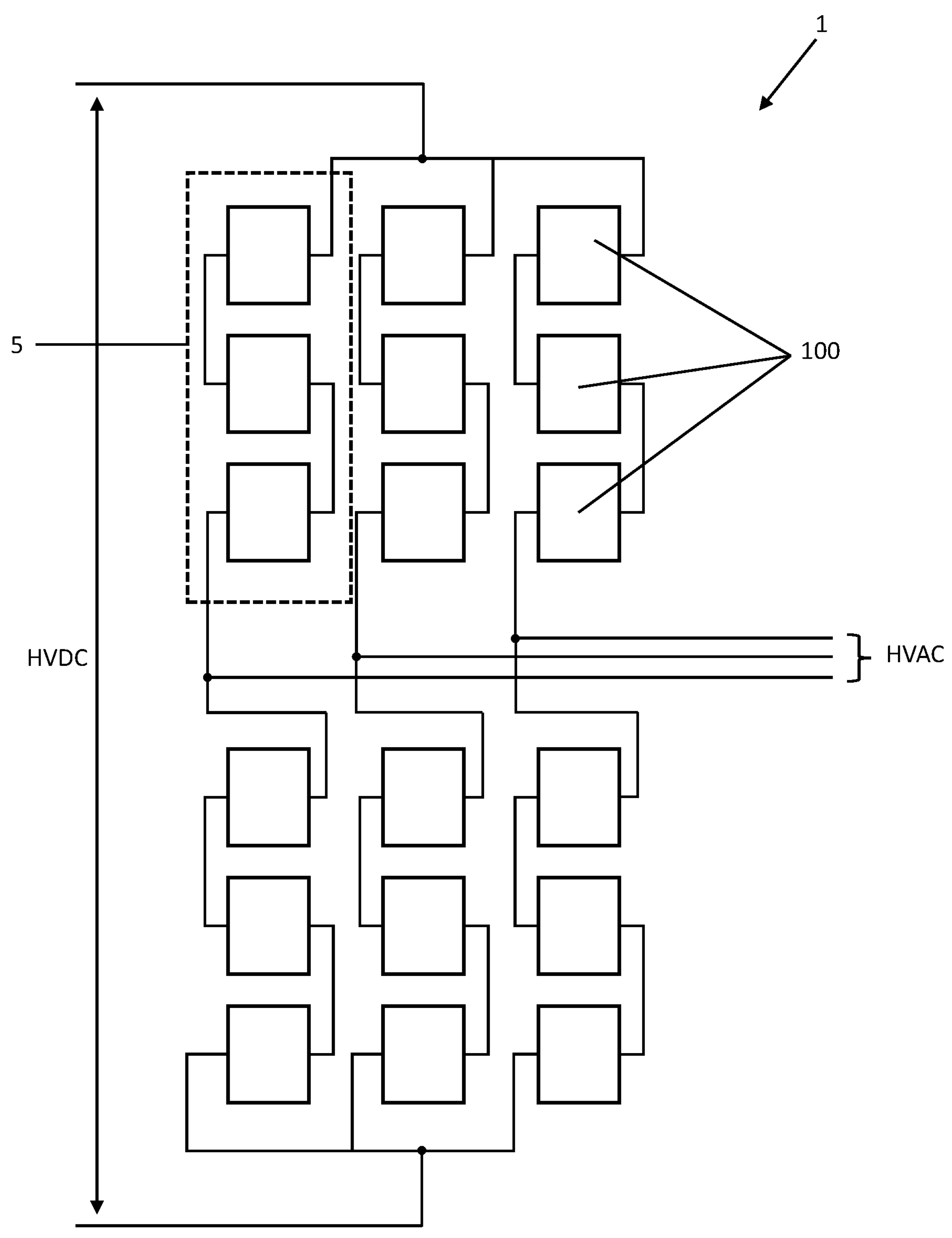
FIG. 2 is a schematic illustration of a HVDC converter.

FIG. 1 is a schematic illustration of a cell 100 of an HVDC converter (not shown; see e.g. FIG. 2). The cell 100 is comprised by a valve (not shown; see e.g. FIG. 2) of an HVDC converter. The cell comprises an energy storage 110, which for example may be one or more capacitor or super-capacitor, and a switch arrangement 120. The cell 100 is connected in series to other cells (not shown; see e.g. FIG. 2) of the valve of the HVDC converter via connectors 115. As indicated in the present figure, the energy storage 110 may be connected to the connectors 115 via the switch arrangement 120.

In the present example, the switching arrangement 120 comprises two switches 121 arranged in a half-bridge configuration. However, it will be appreciated that the switch arrangement 120 may comprise any number of switches 121. For example, the switch arrangement 120 may comprise four switches, arranged in a full-bridge arrangement. The switches 121 may be semiconductor switches of power semiconductor switches. The switch arrangement 120 may be operated so as to charge, discharge, or bypass the energy storage 110 during the operation of the cell 100.

The cell 100 further comprises a mechanical bypass switch 130, which may be configured for bypassing the energy storage 110 and the switch arrangement 120. However, the cell 100 may not necessarily be limited to comprise a mechanical bypass switch 130. For example, a mechanical bypass switch may be arranged outside of the cell 100.

FIG. 1 further shows a cell controller 21 and a main controller 25 comprised by a control system 20 of the HVDC converter. The cell controller 21 is operably connected to the switch arrangement 120 of the cell 100 for switching the cell 100 between an active mode and an inactive mode. The control system 20 may further comprise additional cell controllers (not shown) which may be operably connected to switch arrangements of the remaining cells of the HVDC converter.

The main controller 25 may be operably connected to the cell controllers 21 of the HVDC converter and may be configured to generate switching commands for the cell controllers 21 of the HVDC converter, thereby contributing to converting High Voltage Alternating Current, HVAC, to HVDC or HVDC to HVAC. The cell controller 21 is further configured send a status update, indicating the cell 100 switching between the active mode and the inactive mode, to the main controller 25 for modifying the switching commands.

The cell controller 21 may be operably connected to the switch arrangement 120 via the gate units 22 of the cell 10. The gate units 22 are communicatively coupled to the cell controller 21. Each gate unit 22 may further be connected to a respective switch 121 of the switch arrangement 120. The control system 20 may be configured to determine an error indication based on a monitored communication between one of the gate units 22 and the cell controller 21.

The control system 20 may further be operably connected to the mechanical bypass switch 130 and to operate the cell 100 in a mechanical bypass mode in which the mechanical bypass switch 130 is arranged to permanently bypass the energy storage 110 and the switch arrangement 120.

FIG. 2 is a schematic illustration of a HVDC converter 1 comprising a plurality of converter valves 5, each comprising a plurality of cells 100 which may be similarly configured as the cell discussed above with reference to FIG. 1. The HVDC converter 1 is connected between two HVDC poles and three HVAC phases. Each valve 5 is connected between one of the HVDC poles and a respective HVAC phase. A converter valve 5 may be understood as valve arm. Further, two converter valves 5 connected to the same HVAC phase may be understood as a valve leg. The HVDC converter 1 is an exemplary embodiment which comprises six converter valves 5, wherein each converter valve 5 comprises three cells 100. However, the HVDC converter 1 is not limited to comprising six converter valves 5. Further, the HVDC converter 1 is not limited to comprising converter valves 5 each comprising three cells 100. A converter valve 5 may comprise, substantially, any number of cells 100. For example, a converter valve 5 may comprise one, two, three, four, five, six, seven, eight, or more cells 100.

Each cell 100 may comprise an energy storage (not shown; see e.g. FIG. 1) and a switch arrangement (not shown; see e.g. FIG. 1). The plurality of cells 100 are operable contribute to converting High Voltage Alternating Current, HVAC, to HVDC or HVDC to HVAC when operating in the active mode. The HVDC converter comprises a control system (not shown; see e.g. FIG. 1) operably connected to the switch arrangements of the cells 100. The control system is configured to operate each cell of the plurality of cells in the active mode and in the inactive mode. In the active mode, the control system may operate the switch arrangement of each of the cells 100 so as to contribute to converting High Voltage Alternating Current, HVAC, to HVDC or HVDC to HVAC. In the inactive mode, the control system may operate or arrange the switch arrangement of each of the cells 100 to bypass the electrical energy storage of the cell 100. The control system is further configured to determine an error indication for a cell 100 operating in the active mode and switch the cell 100 from operating in the active mode to operate in the inactive mode in response to the error indication. The control system is further configured to determine a recovery indication for the cell 100 operating in the inactive mode and switch the cell 100 from operating in the inactive mode to operate in the active mode in response to the recovery indication.

Figure 3:
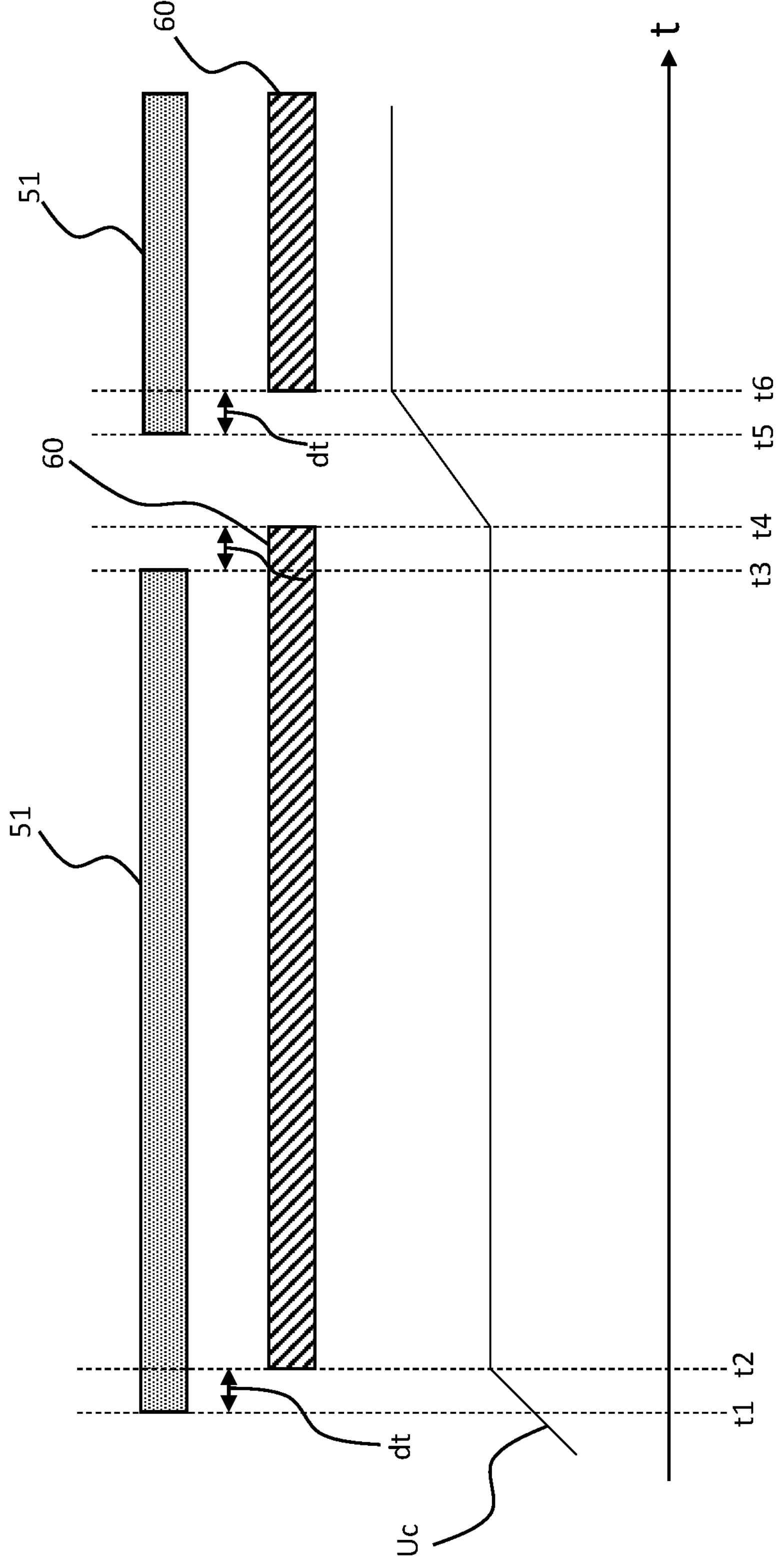
FIG. 3 is an illustration of operations of a cell of a HVDC converter according to a method for handling a fault in the HVDC converter.

FIG. 3 is an illustration of operations of a cell (not shown; see e.g. FIG. 1 or 2) of a HVDC converter (not shown; see e.g. FIG. 2) according to a method for handling a fault in the HVDC converter. The illustration of FIG. 3 is a graph, wherein the horizontal axis t indicates the flow of time, from left to right.

At time t1, an error indication 51 for a cell operating in the active mode is determined. In response to the error indication 51, the cell operating in the active mode is switched to operating in the inactive mode 60, at time t2. There is a time delay dt between determining the error indication 51 at the time t1 and switching the cell to operating in the inactive mode 60 at the time t2.

At time t3 a recovery indication for the cell operating in the inactive mode is determined. The recovery indication may be based on the error indication 51 ceasing. At time t4, in response to the recovery indication, the cell operating in the inactive mode is switched to operating in the active mode. There is a time delay dt between determining the recovery indication 51 at the time t3 and switching the cell to operating in the active mode at the time t4.

At time t5, a second error indication 51 for a cell operating in the active mode is determined. In response to the second error indication 51, the cell operating in the active mode is switched to operating in the inactive mode 60, at time t6. There is a time delay dt between determining the second error indication 51 at the time t5 and switching the cell to operating in the inactive mode 60 at the time t6. The time delays dt may be substantially the same length.

Before the time t1, a voltage Uc of the energy storage of the cell is increasing, due to the cell being in the active mode. At time t2, the increase of the voltage Uc is halted, due to the cell being switched to operating in the inactive mode, in which the energy storage of the cell is bypassed. At time t4, the voltage Uc is increasing again, due to the cell being operated in the active mode again. At the time t6, the increase of the voltage Uc is halted again, due to cell being switched to operating in the inactive mode again.

Figure 4:
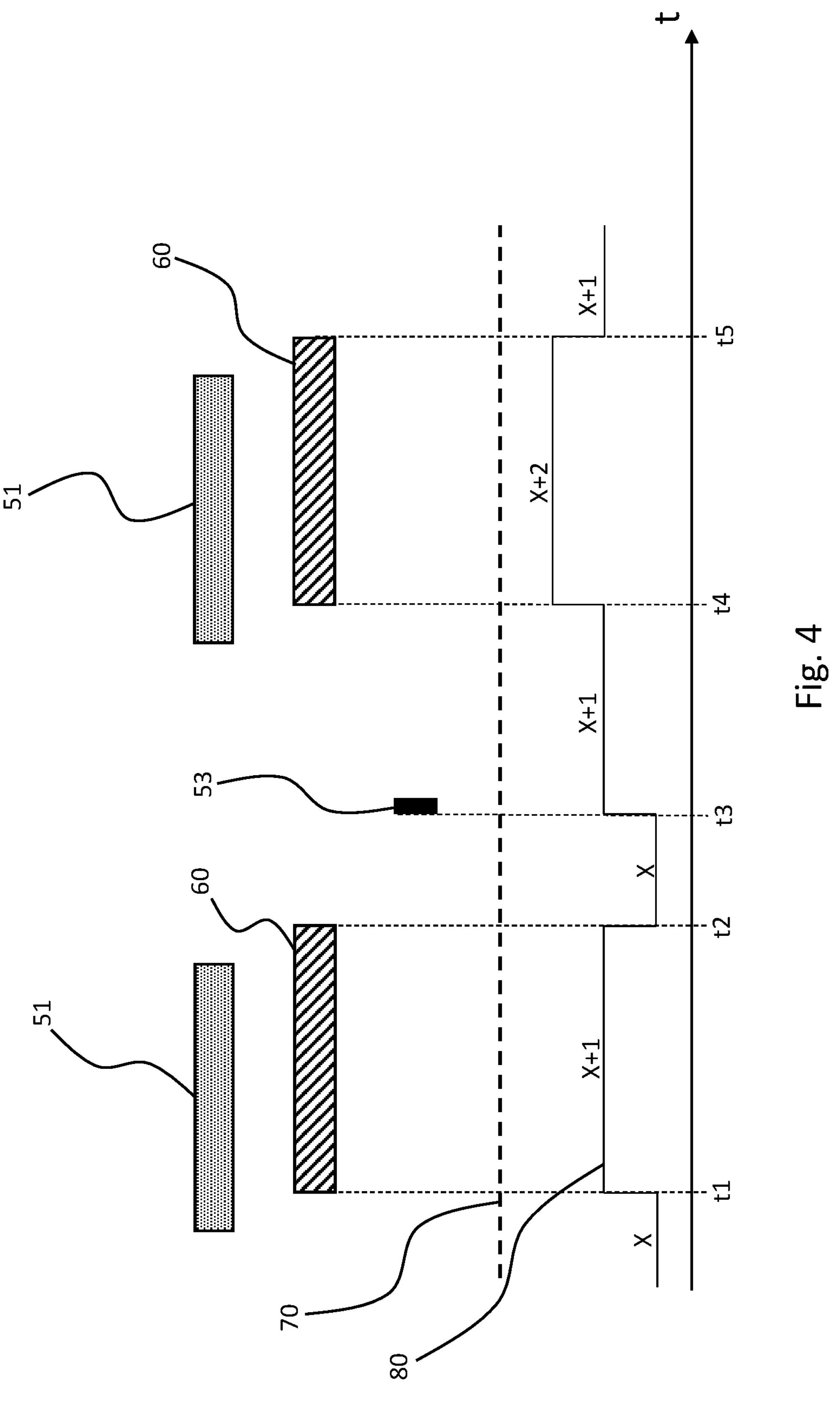
FIG. 4 is an illustration of handling of cells of a HVDC converter according to a method for handling a fault in the HVDC converter.

FIG. 4 is an illustration of handling of cells (not shown; see e.g. FIG. 1 or 2) of a HVDC converter (not shown; see e.g. FIG. 2) according to a method for handling a fault in the HVDC converter. The illustration of FIG. 4 is a graph, wherein the horizontal axis t indicates the flow of time, from left to right.

FIG. 4 illustrates a horizontal line which indicates threshold for a predetermined number 70 of cells of a plurality of cells of a valve which are operated in the inactive or the mechanical bypass mode. FIG. 4 further illustrates a curve 80 which indicates the current number of cells which are operated in the inactive or the mechanical bypass mode. The curve 80 is increases/decreases in a stepwise fashion, and further comprises labels for each respective step indicating the number of cells which are currently being operated in the inactive or the mechanical bypass mode. The curve 80 begins at indicating that X number of cells are currently being operated in the inactive or the mechanical bypass mode. The threshold for a predetermined number 70 may be understood as being X+3.

The method illustrated in FIG. 4 illustrates that a first cell is switched from operating in the active mode to operate in the inactive mode 60 at time t1, in response to an error indication 51. There is a delay between switching of the cell and determining the error indication 51, as discussed more thoroughly in the text referencing FIG. 3. When the cell is switched to operate in the inactive mode 60, the curve 80 is increased by one step, such that it is X+1.

After a short delay after the error indication ceases, the cell is switched back to operating in the active mode, at time t2. Thus, the curve 80 is decreased by one step, such that is X again.

At time t3, a fault indication 53 for a second cell of the valve is determined. In response to the fault indication, the second cell is switched from operating in an active mode to operating in a mechanical bypass mode in which a mechanical bypass switch of the cell is arranged to permanently bypass the energy storage and the switch arrangement of the second cell. Consequently, the curve 80 is increase by one step, such that it is X+1.

At time t4, the first cell is switched to operating in the inactive mode 60, in response to a second error indication 51. The curve 80 is consequently increased by one, such that it is X+2. The first cell is switched to operate in the active mode, at time 5, in response to determining that the error indication has ceased, which may be understood as a recovery indication. Consequently, the curve is decreased by one step, such that it is X+1. If two other cells of the valve would be switching to operating in the inactive mode 60 or the mechanical bypass mode, the curve 80 would reach the threshold for the predetermined number 70 of cells of the valve which are operated in the inactive or the mechanical bypass mode. The method may comprise, in response to the predetermined number 70 of cells of the valve being operated in the inactive mode 60 or the mechanical bypass mode, tripping the valve.

While the present disclosure has been illustrated in the appended figures and the foregoing description, such illustration is to be considered illustrative or exemplifying and not restrictive; the present disclosure is not limited to the disclosed embodiments. Other variations to the disclosed embodiments can be understood and effected by those skilled in the art in practicing the claimed subject matter, from a study of the figures, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method for handling a fault in a High Voltage Direct Current, HVDC, converter comprising:

a plurality of converter valves, wherein each converter valve comprises a plurality of cells electrically connected in series, wherein each cell of the plurality of cells comprises an energy storage and a switch arrangement, and wherein the plurality of cells are operable to convert High Voltage Alternating Current, HVAC, to HVDC or HVDC to HVAC;

wherein each cell of the plurality of cells is configured to be operated in an active mode, in an inactive mode and a mechanical bypass mode;

the method comprising:

operating the switch arrangement of each of the cells operating in the active mode so as to convert High Voltage Alternating Current, HVAC, to HVDC or HVDC to HVAC, while arranging the switch arrangement of each of the cells operating in the inactive mode to bypass the energy storage of the cell, in response to an error indication for a cell operating in the active mode, switching the cell from operating in the active mode to operate in the inactive mode, in response to a recovery indication for the cell operating in the inactive mode, switching the cell from operating in the inactive mode to operate in the active mode;

in response to a fault indication for a cell of the plurality cells, switching the cell to operating in the mechanical bypass mode in which a mechanical bypass switch of the cell is arranged to permanently bypass the energy storage and the switch arrangement of the cell;

determining a number of cells of a converter valve of the plurality of converter valves which are being operated in the inactive mode and a number of cells which are being operated in the mechanical bypass mode, and in response to a predetermined number of cells of a converter valve of the plurality of converter valves being operated in the inactive mode or the mechanical bypass mode, tripping the converter valve.

2. A High Voltage Direct Current, HVDC, converter comprising:

a plurality of converter valves, wherein each converter valve comprises a plurality of cells electrically connected in series, and wherein each cell of the plurality of cells comprises an energy storage and a switch arrangement, wherein the plurality of cells are operable to convert High Voltage Alternating Current, HVAC, to HVDC or HVDC to HVAC, wherein each cell of the plurality of cells further comprises a mechanical bypass switch configured for bypassing the energy storage and the switch arrangement of the cell, and;

a control system operably connected to the switch arrangements of the plurality of cells and configured to operate each cell of the plurality of cells in an active mode and in an inactive mode, and wherein the control system is operably connected to the mechanical bypass switches and configured to operate each cell in a mechanical bypass mode in which the mechanical bypass switch of the cell is arranged to permanently bypass the energy storage and the switch arrangement of the cell;

wherein the control system is further configured to:

operate the switch arrangement of each of the cells operating in the active mode so as to contribute to converting High Voltage Alternating Current, HVAC, to HVDC or HVDC to HVAC while the switch arrangement of each of the cells operating in the inactive mode is arranged to bypass the electrical energy storage of the cell, determine an error indication for a cell operating in the active mode and switch the cell from operating in the active mode to operate in the inactive mode in response to the error indication, determine a recovery indication for the cell operating in the inactive mode, switch the cell from operating in the inactive mode to operate in the active mode in response to the recovery indication, determine a fault indication for a cell of the plurality of cells and switch the cell to operate in the mechanical bypass mode in response to the fault indication, determine a number of cells of a converter valve of the plurality of converter valves which are being operated in the inactive mode and a number of cells which are being operated in the mechanical bypass mode, and trip a converter valve of the plurality of converter valves when a predetermined number of cells of the plurality of cells of the converter valve are operated in the inactive mode or the mechanical bypass mode.

3. An HVDC converter according to claim 2, wherein the control system comprises a plurality of cell controllers, wherein each cell controller is operably connected to a switch arrangement of a respective cell for switching the cell between the active mode and the inactive mode.

4. An HVDC converter according to claim 3, wherein the control system further comprises a main controller operably connected to the plurality of cell controllers and configured to generate switching commands for the plurality of cell controllers, thereby converting High Voltage Alternating Current, HVAC, to HVDC or HVDC to HVAC.

5. An HVDC converter according to claim 4, wherein a cell controller of the plurality of cell controllers is further configured send a status update, indicating a cell switching between the active mode and the inactive mode, to the main controller for modifying the switching commands.

6. An HVDC converter according to claim 2, wherein each cell controller is operably connected to the switch arrangement of a respective cell via gate units of the respective cell, wherein the gate units are communicatively coupled to the cell controller, and wherein the control system is further configured to determine the error indication based on a monitored communication between a gate unit of the gate units and the cell controller which is communicatively coupled to said gate unit.

* * * * *